(No Model.)
J. HANLEY.
ASH SIFTER.
No. 413,936. Patented Oct. 29, 1889.
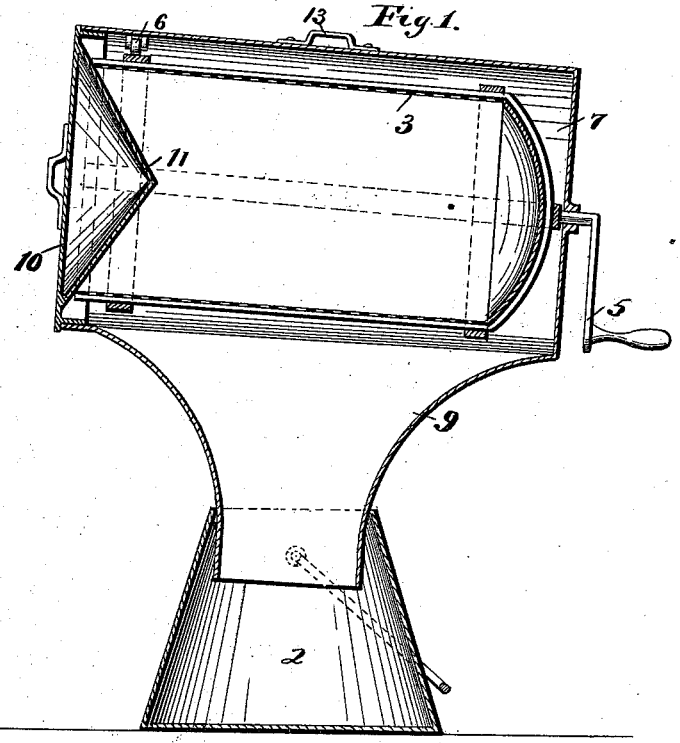
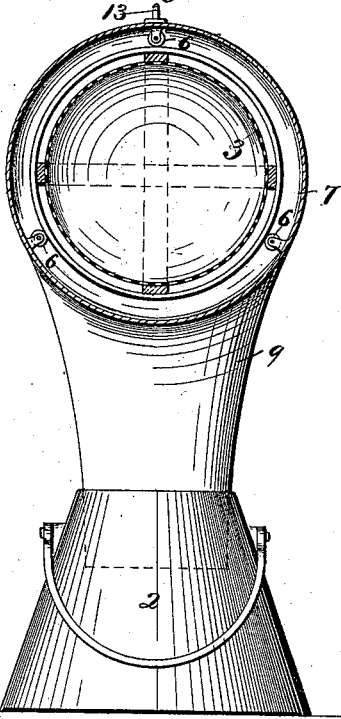
Witnesses
J. Jessen
L. M. Gaskill
Inventor
John Hanley.
By Paul T. Merwin Attys

UNITED STATES PATENT OFFICE.

JOHN HANLEY, OF MINNEAPOLIS, MINNESOTA.

ASH-SIFTER.

SPECIFICATION forming part of Letters Patent No. 413,936, dated October 29, 1889.

Application filed May 6, 1889. Serial No. 309,673. (No model.)

*To all whom it may concern:*

Be it known that I, JOHN HANLEY, of Minneapolis, in the county of Hennepin and State of Minnesota, have invented certain new and useful Improvements in Ash-Sifters, of which the following is a specification.

My invention relates to devices adapted to screen coal-ashes and separate the same from the unconsumed lumps of coal. Its object is to provide a sifter simple, strong, and durable, which shall be dustless and fire-proof; and it consists generally in the construction and combination hereinafter described, and particularly pointed out in the claims.

In the drawings forming part of this specification, Figure 1 is a vertical longitudinal section. Fig. 2 is a vertical cross-section.

In the drawings, 2 is a suitable metallic ash-receptacle having a broad base and narrowed top provided with a preferably circular opening or mouth.

7 is a suitable metallic case having the tapering or funnel-shaped open lower part 9, adapted to fit into the top of the receiver or bucket 2 and to be supported in the same, and a substantially cylindrical top.

3 is the sieve, constructed, preferably, of iron and of substantially cylindrical form, and provided with suitable perforations or openings in its side walls. A crank 5, secured to the closed end of the cylinder and turning in suitable bearings in the case 7, is adapted to rotate it. The opposite end of the sieve is carried upon suitable sheaves or rollers 6, arranged around the interior surface of the case 7. The open ends of the case and of the sieve are closed by the common lid or cover 10, adapted to fit tightly into the case and to nearly touch the walls of the sieve. It is preferably made with the inward conical projection 11, which tends to keep the contents of the sieve away from the end of the sieve. The funnel shape of the bottom 9 of the case permits of the case being tilted to a considerable angle in any desired direction while still supported in the receptacle 2. In use the case is preferably slightly tilted toward the crank end, so as to carry the contents of the sieve away from the cover 10.

The mode of operation is as follows: The lid 10 being removed, the case is tilted to any convenient angle toward the crank end to allow of convenient filling from a shovel or vessel. The lid is then returned to place, entirely closing the case and nearly closing the open end of the sieve. The case is then tilted back nearly to a horizontal position and the crank turned to rotate the sieve. The ashes are screened through the perforations of the sieve and fall into the receptacle 2, and, all openings from case and receptacle being tightly closed, no dust can escape during the operation. All the ashes having been separated from the fragments of coal, the lid 10 is removed and the case tilted forward to pour them out into a suitable vessel. All the parts of the machine being metallic, it is absolutely fire-proof, so that ashes containing live coals may be screened without danger of fire. When the receptacle 2 is filled, the case 7 may be lifted by the handle 13 out of the receptacle, which can then be emptied.

I claim as my invention—

1. In a device of the class described, the combination of the receptacle-case 7, having a cylindrical body, and the funnel-shaped bottom 9, adapted to fit into a suitable receptacle, the cylindrical rotatable sieve 3, having the crank 5 and supported on the rollers 6, and the lid 10, adapted to close the open ends of the case and of the sieve, substantially as described.

2. The combination, with a case having an open end and a bottom portion adapted to fit into a suitable receptacle and to direct material from said case into said receptacle, of a sieve arranged in said case and provided with an open end and a cover adapted to close the open ends of the case and sieve.

In testimony whereof I have hereunto set my hand this 9th day of April, 1889.

JOHN HANLEY.

In presence of—
T. D. MERWIN,
A. M. GASKILL.